United States Patent
Popoff et al.

(10) Patent No.: US 9,604,167 B2
(45) Date of Patent: Mar. 28, 2017

(54) MULTISTAGE HIGH CAPACITY AND DEPTH COALESCING MEDIA SYSTEM

(71) Applicant: Parker-Hannifin Corporation, Cleveland, OH (US)

(72) Inventors: Peter Popoff, Modestso, CA (US); Walter Stone, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 422 days.

(21) Appl. No.: 14/155,784

(22) Filed: Jan. 15, 2014

(65) Prior Publication Data

US 2014/0197090 A1    Jul. 17, 2014

Related U.S. Application Data

(60) Provisional application No. 61/752,553, filed on Jan. 15, 2013.

(51) Int. Cl.
| | | |
|---|---|---|
| *B01D 36/02* | (2006.01) | |
| *B01D 36/04* | (2006.01) | |
| *F02M 37/22* | (2006.01) | |
| *B01D 36/00* | (2006.01) | |
| *B01D 27/07* | (2006.01) | |

(52) U.S. Cl.
CPC .......... *B01D 36/003* (2013.01); *B01D 27/07* (2013.01); *B01D 36/02* (2013.01); *B01D 36/04* (2013.01); *F02M 37/221* (2013.01)

(58) Field of Classification Search
None
See application file for complete search history.

(56) References Cited

U.S. PATENT DOCUMENTS

| | | | | |
|---|---|---|---|---|
| 3,105,042 A | * | 9/1963 | Roosa | B01D 29/072 210/234 |
| 4,618,423 A | | 10/1986 | Hodgkins | |
| 7,527,739 B2 | * | 5/2009 | Jiang | B01D 36/003 210/259 |
| 2009/0044702 A1 | | 2/2009 | Adamek et al. | |
| 2011/0062075 A1 | | 3/2011 | Lucas | |
| 2012/0210688 A1 | | 8/2012 | Burns et al. | |

FOREIGN PATENT DOCUMENTS

| | | |
|---|---|---|
| DE | 10 2007 048550 | 4/2008 |
| EP | 208515 | 7/1986 |

(Continued)

OTHER PUBLICATIONS

International Search Report for corresponding Patent Application No. PCT/US2014/011616 dated May 12, 2014.

*Primary Examiner* — Thomas M Lithgow
(74) *Attorney, Agent, or Firm* — Renner, Otto, Boisselle & Sklar, LLP

(57) ABSTRACT

A filter assembly having a first stage filter that filters particulates from fluid flowing through the filter and a second stage filter downstream of the first stage filter that coalesces water from the fluid. By providing the first stage filter upstream of the second stage filter, particulate filtration capacity and efficiency may be provided while protecting the second stage filter from particulates. Protecting the second stage filter from particulates allows for the life of the second stage filter to be extended while providing efficient emulsion removal in the filter assembly.

19 Claims, 7 Drawing Sheets

(56) References Cited

FOREIGN PATENT DOCUMENTS

| | | | |
|---|---|---|---|
| EP | 1544452 A2 | * | 6/2005 |
| GB | 1402586 | * | 8/1975 |
| JP | 60-122266 A | * | 6/1985 |
| WO | 91/03301 | | 3/1991 |
| WO | 2011/101750 | | 8/2011 |

* cited by examiner

MULTISTAGE HIGH CAPACITY AND DEPTH COALESCING MEDIA SYSTEM

RELATED APPLICATIONS

This application claims the benefit of U.S. Provisional Application No. 61/752,553 filed Jan. 15, 2013, which is hereby incorporated herein by reference.

FIELD OF INVENTION

The present invention relates generally to fluid filters and assemblies, and more particularly to a fuel filter and assembly for a vehicle fuel system.

BACKGROUND

In certain fuel systems, such as for vehicles, a pump is provided to move fuel through the system, such as from a fuel tank to an engine. A filter element may be provided downstream (on the pressure side) of the pump to protect downstream components. The filter element may be used to filter a fluid comprising a liquid and impurities. For example, a filter is often used to remove water from a liquid fuel to avoid negative effects to moisture-sensitive components (e.g., fuel injection equipment). Additionally or alternatively, the filter removes contaminants which can be damaging to the same or other components (e.g., engine parts).

SUMMARY OF INVENTION

The present invention provides a filter assembly having a first stage filter that filters particulates from fluid flowing through the filter and a second stage filter downstream of the first stage filter that coalesces water from the fluid. By providing the first stage filter upstream of the second stage filter, particulate filtration capacity and efficiency may be provided while protecting the second stage filter from particulates. Protecting the second stage filter from particulates allows for the life of the second stage filter to be extended while providing efficient emulsion removal in the filter assembly.

According to one aspect of the invention, a filter assembly configured to be coupled to a filter head is provided. The filter assembly includes a housing circumscribing a central axis and having first and second ends and an internal chamber defined therebetween, and a filter element disposed within the internal chamber of the housing, the filter element including a first stage filter circumscribing the central axis and defining a central cavity, a second stage filter downstream of the first stage filter, the second stage filter circumscribing the central axis and defining a central cavity, and a center tube disposed in the central cavity of the first and second stage filters. Fluid flows from the first end of the housing axially towards the second end into the first stage filter where particulates are filtered from the fluid, from the first stage filter axially into the second stage filter where water is coalesced from the fluid, and then from the second stage filter through the center tube towards the first end of the housing.

The filter element may further include a third stage filter disposed to receive fluid from the second stage filter and discharge the fluid into the center tube while allowing coalesced water droplets to move downward.

The first and second stage filters each may have an outer surface coupled to an inner surface of the housing to fluidly seal the first and second stage filters to the housing.

The first and second stage filters may be fluidly sealed to the center tube.

The first stage filter may be disposed in the internal chamber proximate the first end for removing particulates from fluid flowing through the filter element and the second stage filter may be disposed in the internal chamber proximate the second end for coalescing water in the fluid flowing through the filter element.

The filter assembly may further include an end cap proximate the second end of the housing, wherein the end cap is coupled to a lower end of the center tube.

According to another aspect of the invention, a filter assembly configured to be coupled to a filter head includes a housing having upper and lower ends and a chamber defined therebetween, and a filter element disposed within the internal chamber of the housing. The filter element includes a first stage filter defining a central cavity and having an outer surface coupled to an inner surface of the housing, a second stage filter downstream of the first stage filter, the second stage filter defining a central cavity and having an outer surface coupled to an inner surface of the housing, a center tube disposed in the central cavity of the first and second stage filters and being coupled thereto, the center tube having upper and lower ends and defining a fluid flow path therethrough, and a third stage filter disposed at the lower end of the center tube.

Fluid flows from the first end of the housing through the first stage filter, the second stage filter, the third stage filter, and then along the fluid flow path in the center tube.

The first stage filter may be disposed in the internal chamber proximate the upper end for removing particulates from fluid flowing through the filter element and the second stage filter is disposed in the internal chamber proximate the lower end for coalescing water in the fluid flowing through the filter element.

The first and second stage filters mat be annular rolled filter elements.

The filter assembly may further include an end cap proximate the lower end of the housing, wherein the end cap is coupled to the lower end of the center tube.

According to still another aspect of the invention, a filter assembly configured to be coupled to a filter head includes a housing having first and second ends and a chamber defined therebetween, and a filter element disposed within the internal chamber of the housing. The filter element includes a first stage filter defining a central cavity and being disposed in the internal chamber proximate the first end for removing particulates from fluid flowing through the filter element, a second stage filter defining a central cavity and being disposed in the internal chamber proximate the second end for coalescing water in the fluid flowing through the filter element, and a third stage filter disposed to receive fluid from the second stage filter and discharge the fluid towards the first end while allowing coalesced water droplets to move downward.

The foregoing and other filter assemblies according to the invention optionally may be further characterized by one or more of the following features.

The filter assembly may further include a center tube disposed in the central cavity of the first and second stage filters.

The third stage filter may be disposed to receive fluid from the second stage filter and discharge the fluid into the center tube.

The third stage filter may extend downwardly from the center tube.

The third stage filter may extend upwardly into the center tube.

The third stage filter may be disposed radially inwardly of the second stage filter.

The filter assembly may further include a cover coupled to the first end of the housing, wherein the cover includes at least one inlet passage for directing fluid to the first stage filter and at least one outlet passage for expelling fluid.

The inlet passage may be radially outwardly spaced from the outlet passage.

The filter assembly may further include a gasket coupled to an upper end of the center tube to isolate the flow entering the first stage filter from the flow exiting the center tube.

The filter assembly may further include an end cap proximate the second end of the housing, wherein the end cap is coupled to a lower end of the center tube.

The first and second stage filters may be annular rolled filter elements and the third stage filter may be a hydrophobic barrier.

The foregoing and other features of the invention are hereinafter described in greater detail with reference to the accompanying drawings.

DETAILED DESCRIPTION

The principles of this present application have particular application to filter assemblies for removing particulates and other contaminants from a fluid system, such as from a fuel stream in a fuel system for a vehicle, and thus will be described below chiefly in this context. It will of course be appreciated, and also understood, that principles of this invention may be applicable to other filter assemblies where it is desirable to remove particulates and/or water from a fluid, such as from hydraulic fluid in an aircraft.

Figure 1:
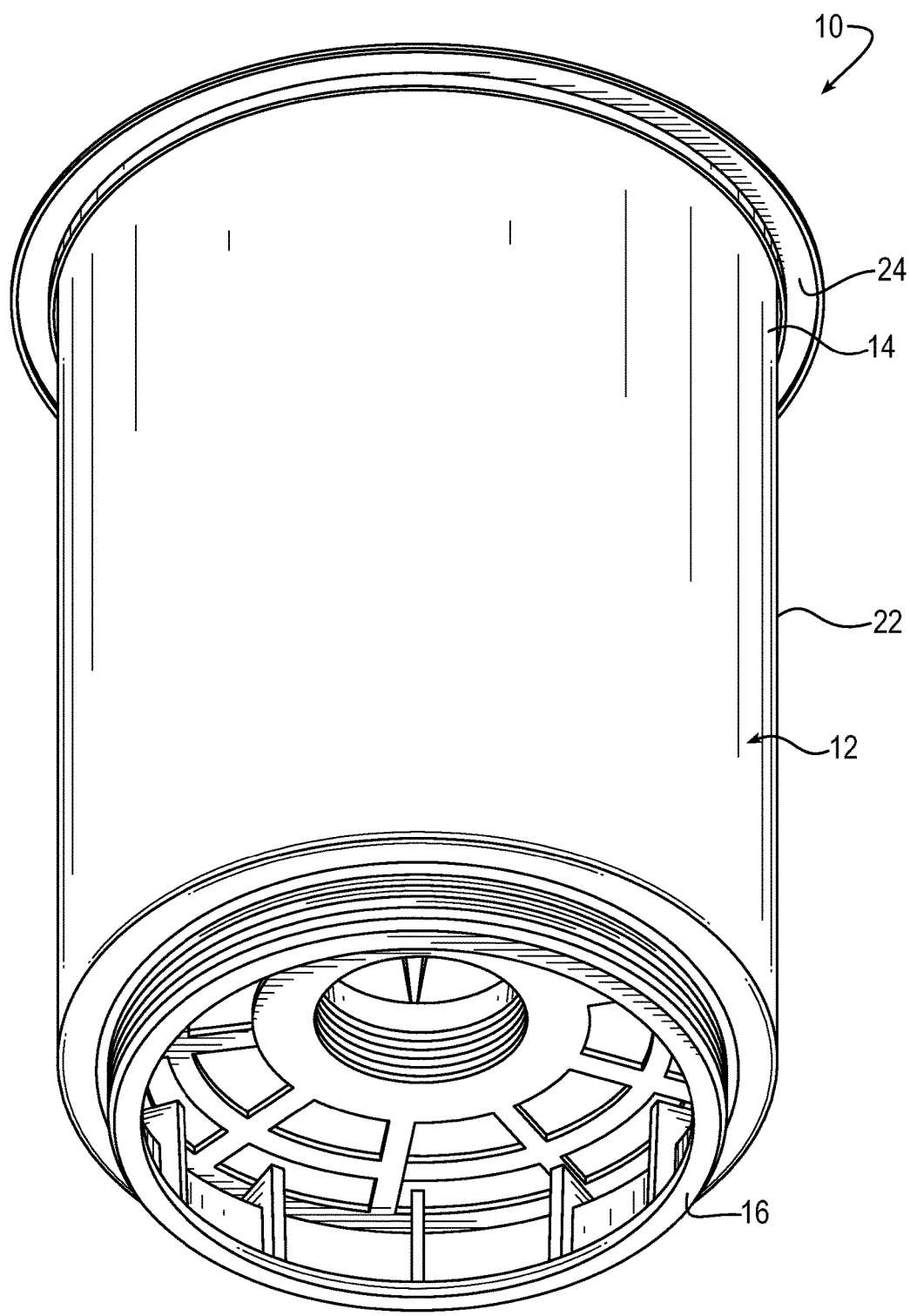
FIG. 1 is a perspective view of an exemplary filter assembly according to the invention.
Figure 2:
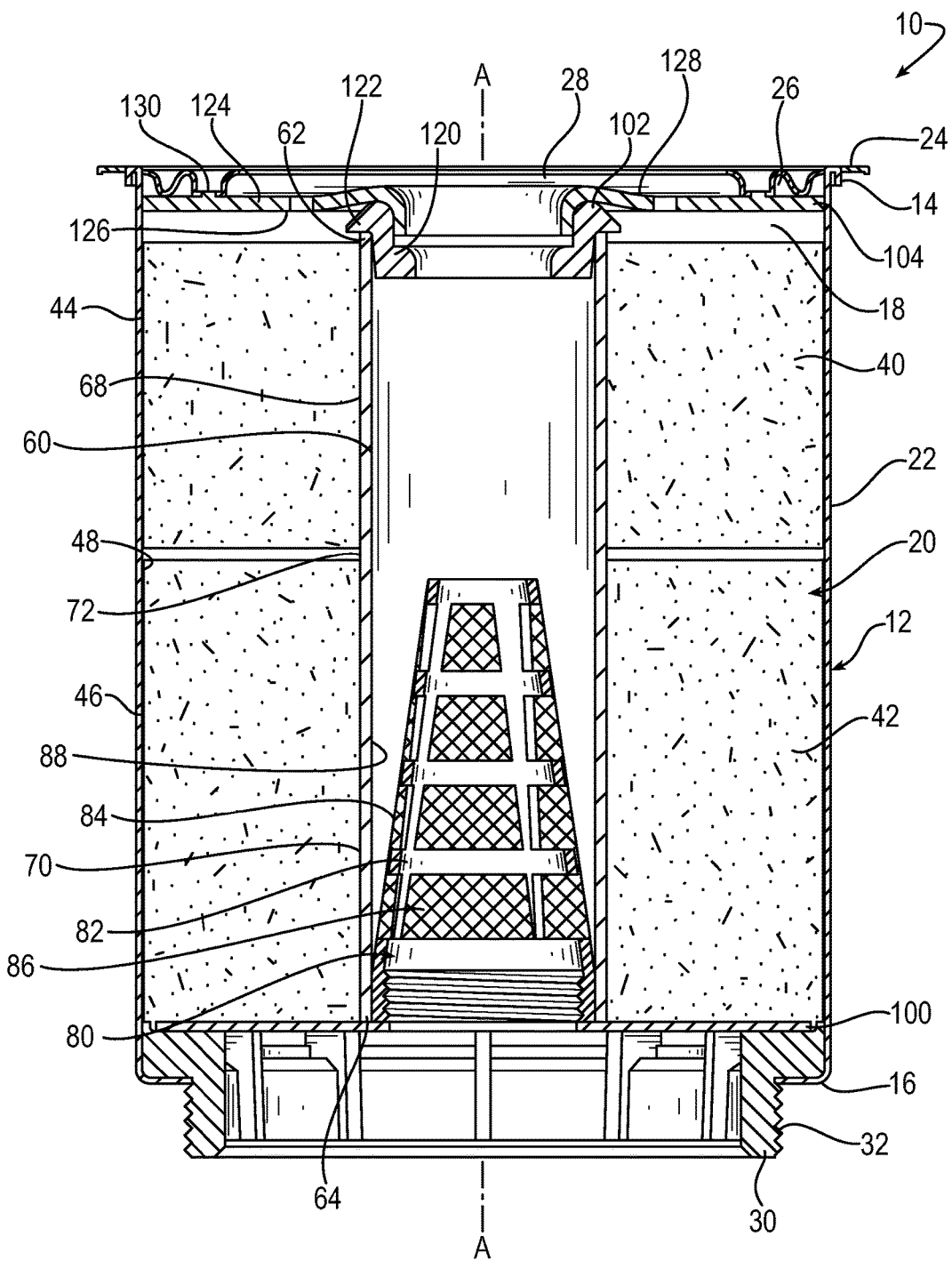
FIG. 2 is a cross-sectional view of the exemplary filter assembly.

Referring now in detail to the drawings, and initially to FIGS. 1 and 2, a filter assembly is designated generally by reference numeral 10. The filter assembly 10 can be located downstream, on a pressure side of a pump for moving fuel through a fuel system for a vehicle, e.g., from the tank to the engine. It will of course be appreciated that other locations and applications of the filter assembly are possible.

The filter assembly 10 includes a housing 12 having first and second ends, in particular upper and lower ends, 14 and 16 and an internal chamber 18 defined therebetween, and a filter element 20 disposed within the internal chamber 18. The housing 12, which circumscribes a central axis A-A, may be a cylindrical canister that is closed at the first end 14 and open at the second end 16. For example, the housing 12 may include a body 22 and a cover 24 coupled to the body 22 in any suitable manner, such as by a threaded connection to close the first end 14. The cover 24 may include one or more openings 26, such as a plurality of circumferentially spaced openings at an outer portion of the cover 24 for fluid to enter the internal chamber 18. The cover 24 may also include one or more openings 28 radially inwardly spaced from the openings 26 for fluid to exit the internal chamber 18. Fluid, such as fuel, enters the openings 26 from a filter head, which may be coupled to the housing 12 in any suitable manner, and the fuel flows through the filter element 20 where water and particulates are removed from the fuel. The fuel then exits the housing 12 through the openings 28 and flows into the filter head.

Water coalesced from the fuel by the filter element 20 flows downward and out the second end 16 of the housing 12 into a reservoir coupled to the housing 12 in any suitable manner. For example, the housing 12 may include threads at the second end 16 or be coupled to a threaded member, such as member 30 having threads 32 for mating with threads on the reservoir. When the reservoir is full or at a predetermined level, water received in the reservoir from the filter element 20 may be drained through a drain in any suitable manner. The fluid level may be determined by a suitable sensor provided in the reservoir.

Referring now to the filter element 20 in detail, the filter element 20 includes a first stage filter 40 circumscribing the central axis and defining a central cavity and a second stage filter 42 downstream of the first stage filter 40, the second stage filter 42 circumscribing the central axis and defining a central cavity. The first stage filter 40 may be any suitable filter, such as a rolled filter element, such as an annular rolled filter element. The second stage filter 42 may also be any suitable filter, such as a rolled filter element, such as an annular rolled filter element, such as a glass free nanofiber media, a pleated media, a depth coalescing media, one or more discs, such as a glass free nanofiber disc, an extruded media, etc.

The first stage filter 40 is disposed in the internal chamber 18 proximate the first end 14 for removing particulates, such as dirt, from the fluid flowing through the filter element 40, thereby providing a high area and capacity filter in the filter element 20 that protects the second stage filter 42 from particulates. The second stage filter 42 is disposed in the internal chamber 18 proximate the second end 16 for coalescing water in the fluid flowing through the filter element 20, thereby optimizing fine droplet water emulsion removal efficiency.

The first and second stage filters 40 and 42 each include an outer surface 44 and 46, respectively, that may be coupled to an inner surface 48 of the body 22 of the housing 12 in any suitable manner, such as by an adhesive that prevents fluid flow between the outer surfaces 44 and 46 of the filters 40 and 42 and the inner surface 48. Alternatively, molded seals may be provided between the inner surface 48 and the outer surfaces 44 and 46 of the first and second stage filters 40 and 42, an interference fit may be provided between the body 22 and the first and second stage filters 40 and 42, etc.

Disposed in the central cavities of the first and second stage filters 40 and 42 is a center tube 60. The center tube 60 has a first end or upper end 62, a second end or lower end 64, and a fluid flow path 66 defined therethrough. The first and second stage filters 40 and 42 may be fluidly sealed to the center tube 60. For example, respective inner surfaces 68 and 70 of the first and second stage filters 40 and 42 may be coupled to an outer surface 72 of the center tube 60 in any suitable manner, such as by an adhesive that prevents fluid flow between the inner surfaces 68 and 70 of the first and second stage filters 40 and 42 and the outer surface 72 of the center tube 60.

The filter element 10 may additionally include a third stage filter 80 disposed to receive fluid from the second stage filter 42 and discharge the fluid into the center tube 60 while allowing coalesced water droplets to move downward. For example, if water droplets coalesced by the second stage filter 42 are not large enough that the droplets move into the reservoir by gravity, the third stage filter 80 can prevent the coalesced water droplets from exiting the filter element 20 through the flow path 66 in the center tube 60. The third stage filter 80 may be disposed radially inwardly of the second stage filter 42 and may be disposed at the lower end 64 of the center tube 60. As shown in FIG. 2, the third stage filter 80 may extend upwardly into the center tube 60. Alternatively, the third stage filter 80 may extend downwardly from the lower end 64 of center tube 60.

The third stage filter 80 may include a body portion 82, such as a plastic body, and a hydrophobic barrier 84, such as a screen that is coupled to the body portion 82 in any suitable manner. The body portion 82 may be a conical frame that includes a plurality of openings 86 covered by the barrier 84 through which the fluid flows through. The body portion 82 may be coupled to an inner surface 88 of the center tube 60 at the lower end 64 in any suitable manner, such as by adhesive, a thread clip, etc., or may be molded into the center tube 60.

During operation of a vehicle in which the filter assembly 10 is installed, fuel flows from a fuel tank of the vehicle to the filter head. The fuel then flows from the filter head into the filter assembly 10 through the openings 26 at the first end 14 of the housing 12. The fuel flows through the filter assembly 10 axially towards the second end 14 of the housing into the first stage filter 40, where particulates are filtered from the fuel. The fuel then flows from the first stage filter 40 axially into the second stage filter 42, where water is coalesced from the fuel. The water droplets coalesced from the fuel by the second stage filter 42 will drop down into the reservoir, and the filtered fluid will flow from the second stage filter 42 through the flow path 66 in the center tube 60 towards the first end 14 of the housing 12. The fuel then exits the housing 12 via the opening 28 and flows into the filter head, where the filtered fluid flows to the engine. If the filter element 20 includes a third stage filter 80, the fuel will pass through the third stage filter 80, where coalesced water droplets that did not drop into the reservoir are separated from the fuel by the hydrophobic barrier 84. The filtered fuel then flows through the hydrophobic barrier 84 and into the flow path 66, where the fuel exits the housing 12 via the openings 28.

By providing the first stage filter 40 upstream of the second stage filter 42, particulate filtration capacity and efficiency may be provided while protecting the second stage filter 42 from particulates. Protecting the second stage filter 42 from particulates allows for the life of the second stage filter 42 to be extended while providing efficient emulsion removal in the filter element 20. The third stage filter 80 serves to remove water droplets coalesced by the second stage filter 42 that did not settle into the reservoir by gravity, thereby providing protection to the engine from water.

Figure 3:
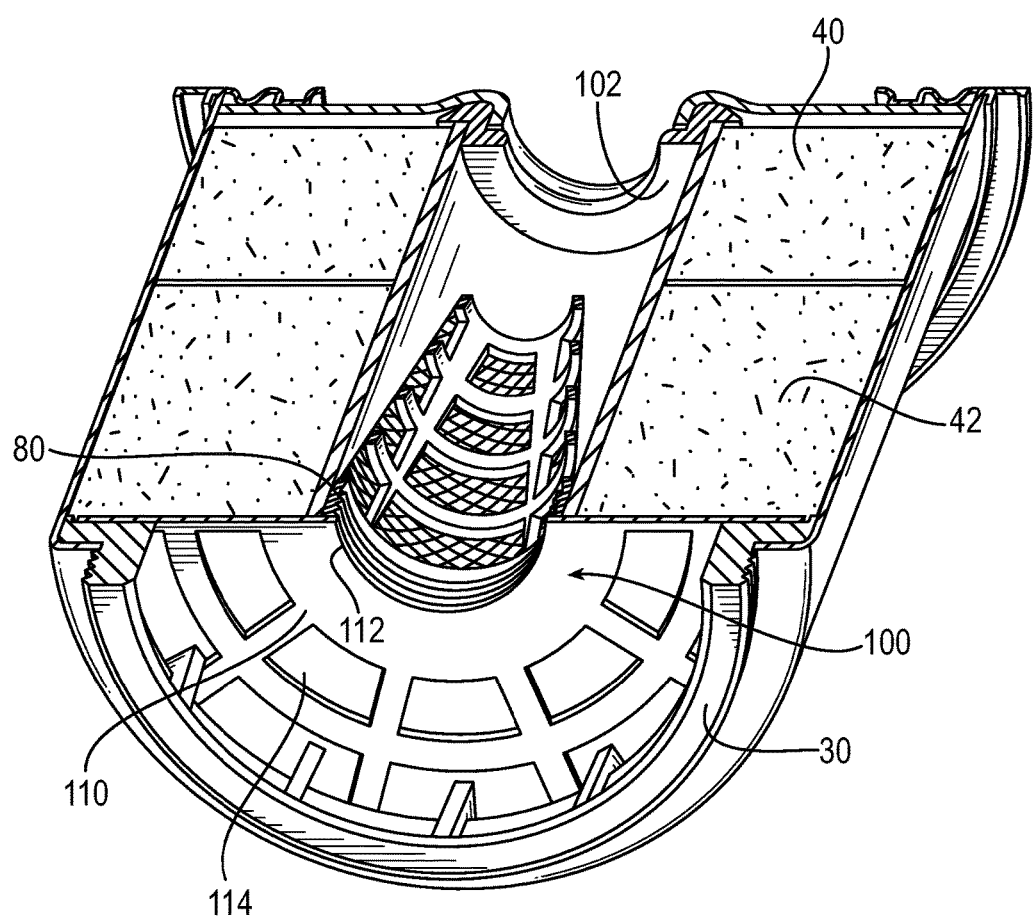
FIG. 3 is a perspective cross-sectional view of the exemplary filter assembly.

Referring now to FIGS. 2 and 3, the filter assembly 10 may additionally include an end cap 100 proximate the second end 16 of the housing 12, a gasket 102 proximate the first end 14 of the housing and a thread plate 104 proximate the first end 14 of the housing. The end cap 100 includes an annular body portion 110 defining a central opening 112 and including a plurality of openings or windows 114 through which the fuel and coalesced water exiting the second stage filter 42 flows. The body portion 110 of the end cap 100 is sealingly bonded, for example by a suitable adhesive, to the lower end 64 of the center tube 60. The body portion 110 of the end cap 100 may additionally be bonded to a downstream end of the second stage filter 42 by a suitable adhesive and to an upstream end of the third stage filter 80 by a suitable adhesive. The body portion may also be coupled to the threaded member 30 or held in the housing 12 by the threaded member 30. In an embodiment, the third stage filter 80 may be a screen that is coupled to the end cap 100 and that extends across the central opening 112 to allow fluid to flow into the flow path 66 in the center tube 60 while preventing coalesced water droplets from flowing through the flow path 66. Additionally, the filter assembly 10 may additionally include an end cap (not shown) proximate the first end 14 of the housing 12.

A short annular skirt (not shown) may extend around the outer periphery of the end cap 100 and project a short distance from the end cap 100 towards the first end 14 of the housing 12 to outwardly bound and support the second stage filter 42. The annular skirt may be coupled to the inner surface 48 of the body 22 in any suitable manner, such as by a suitable adhesive. A short annular collar (not shown) may extend axially upwardly from the inner surface of the end cap 100 around the outer surface 72 of the center tube 60 to outwardly bound and support the center tube 60. The annular collar may be coupled to the outer surface 72 of the center tube 60 in any suitable manner, such as by a suitable adhesive. The annular body portion 110 and the annular collar may define an annular shoulder projecting radially inwardly from the collar and bounding the central opening 104 for supporting the center tube 60 and the third stage filter 80.

The gasket 102 is coupled to the upper end 62 of the center tube 60 and the thread plate 104 is coupled to the gasket 102 to isolate the fluid entering the first stage filter 40 from the fluid exiting the center tube 60. The gasket 102 includes an annular body portion 120 that extends into the center tube 60 and a flange portion 122 extending radially outwardly from the body portion 120 outside the center tube 60 to create a seal with the center tube 60. The thread plate 104 includes a body portion 124 having a lower surface 126 that contacts a top portion of the flange portion 122 to seal to the gasket 102, and an upper surface 128 that contacts one or more projections 130 of the cover 24 that project axially towards the second end 16 to seal to the cover 24. The one or more projections 130 may be an annular projection that contacts the upper surface 128 of the thread plate 104 to separate the fluid entering the housing though the one or more openings 26 from the fluid exiting the housing through the one or more openings 28. The thread plate also includes one or more openings (not shown) through which the fluid flows through from the one or more openings 26 into the first stage filter 40, and one or more openings (not shown) through which the fluid flows through from the center tube 60 to the one or more openings 28.

Figure 4:
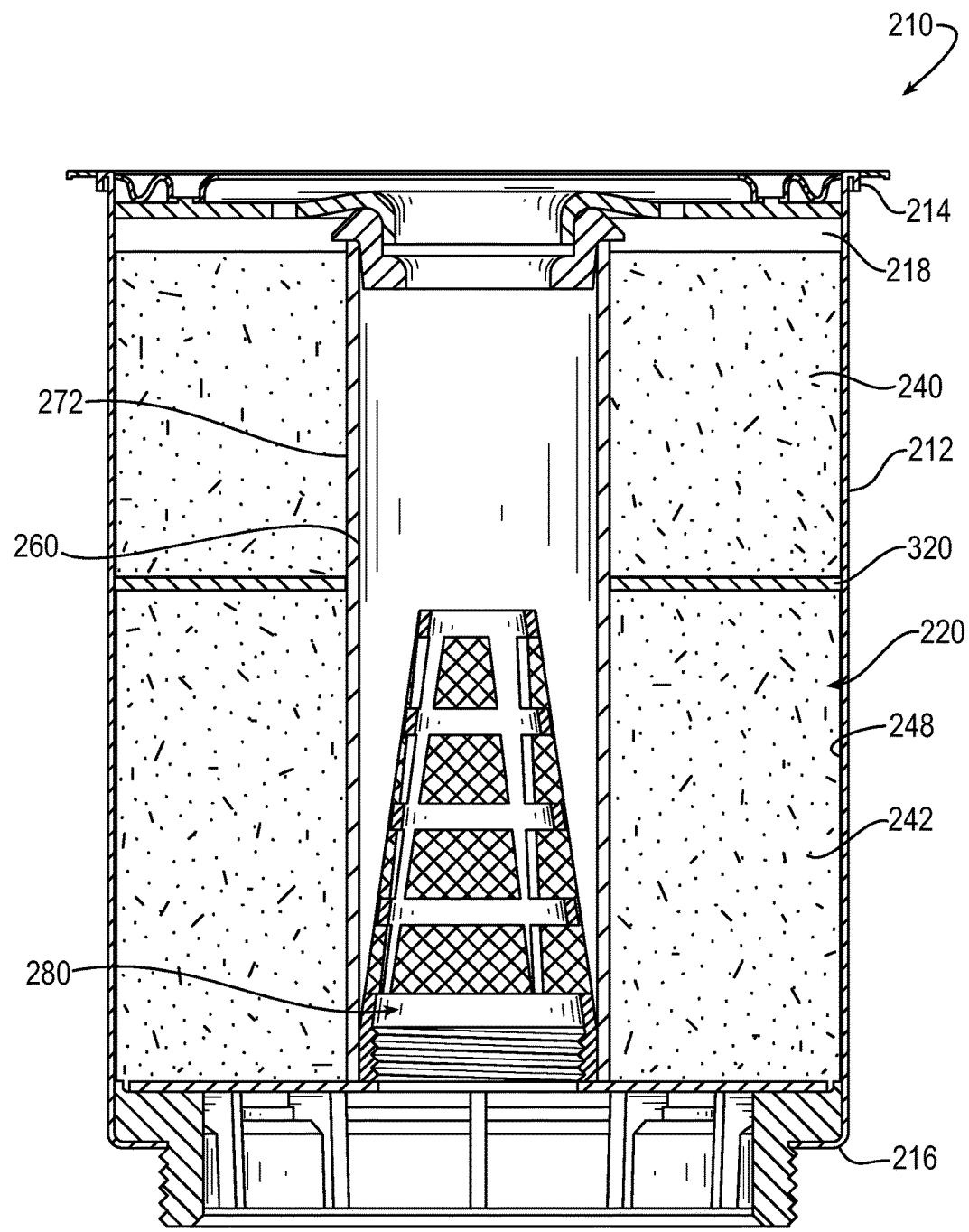
FIG. 4 is a cross-sectional view of another exemplary filter assembly according to the invention.
Figure 5:
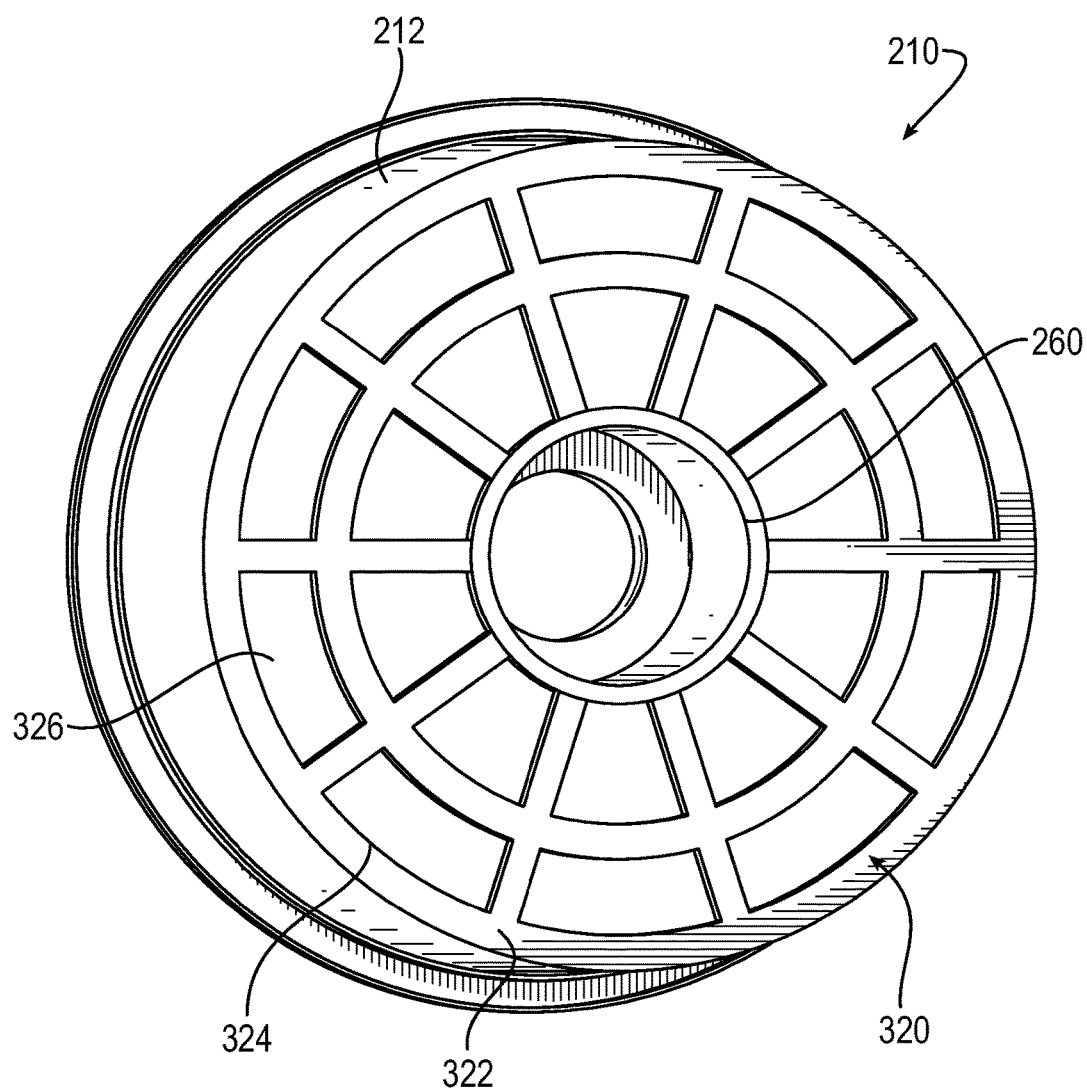
FIG. 5 is a bottom cross-sectional view of the filter assembly of FIG. 4.

Turning now to FIGS. 4 and 5, an exemplary embodiment of the filter assembly is shown at 210. The filter assembly 210 is substantially the same as the above-referenced filter assembly 10, and consequently the same reference numerals but indexed by 200 are used to denote structures corresponding to similar structures in the filter assembly. In addition, the foregoing description of the filter assembly 10 is equally applicable to the filter assembly 210 except as noted below.

Moreover, it will be appreciated upon reading and understanding the specification that aspects of the filter assemblies may be substituted for one another or used in conjunction with one another where applicable.

The filter assembly 210 includes a housing 212 having first and second ends 214 and 216 and an internal chamber 218 defined therebetween, and a filter element 220 disposed within the internal chamber 218. The filter element 220 includes a first stage filter 240, a second stage filter 242, a center tube 260, and a third stage filter 280. The filter assembly 210 also includes an end cap 320 between the first stage filter 240 and the second stage filter 242 for separating the filters 240 and 242.

The end cap 320 may be any suitable end cap, such as a plate with an o-ring or suitable material, such as felt to separate the filters 240 and 242. For example, as shown in FIG. 5, the end cap 320 includes a plate 322 having a plurality of openings 324 covered by felt 326. The plate 322 may be coupled to the inner surface 248 of the body 222 of the housing 212 and to the outer surface 272 of the center tube 260, for example by a suitable adhesive. Fluid that exits the first stage filter 240 flows axially through the felt covered openings 324 and into the second stage filter 242.

Figure 6:
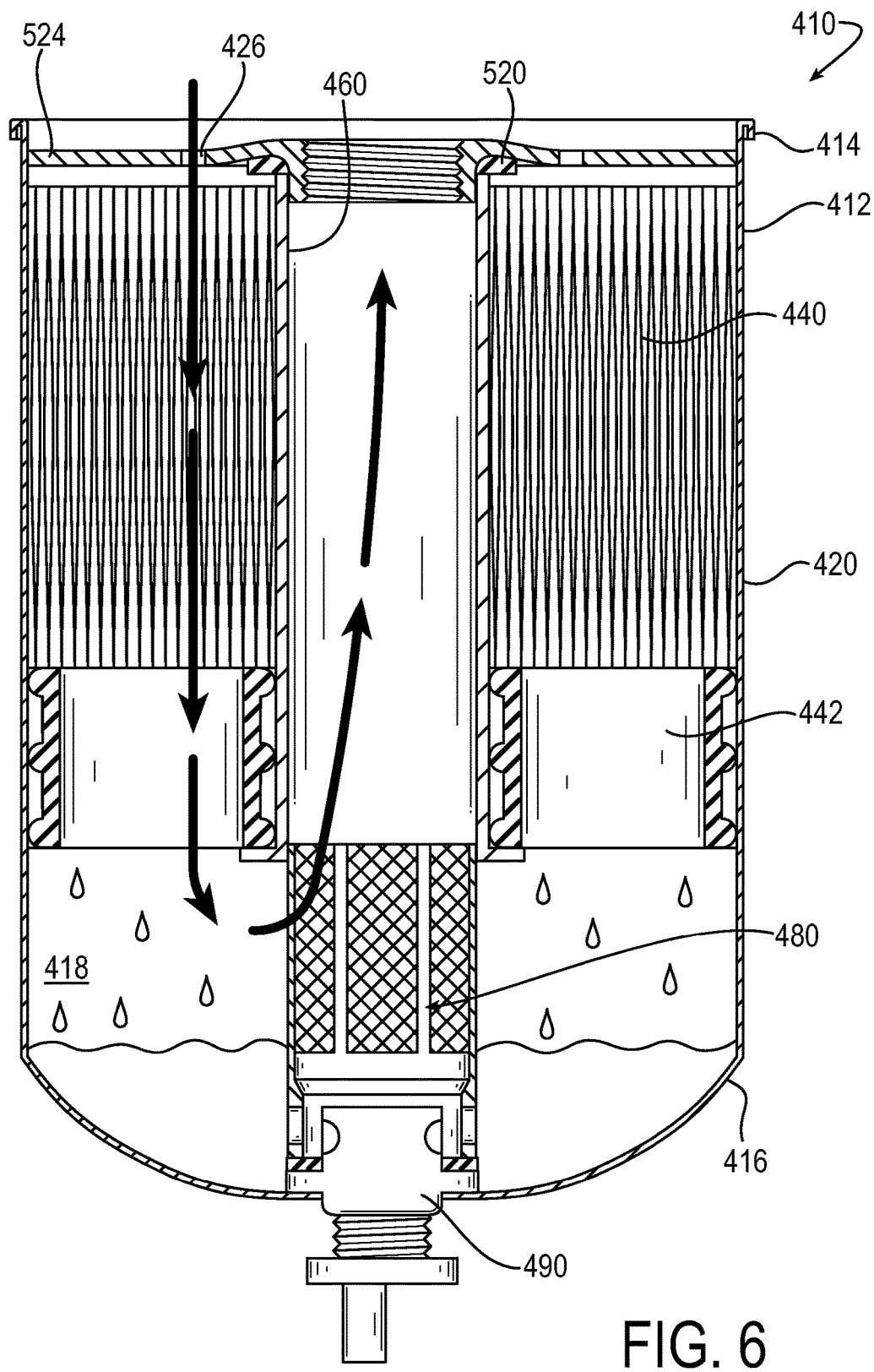
FIG. 6 is a cross-sectional view of still another exemplary filter assembly according to the invention.

Turning now to FIG. 6, an exemplary embodiment of the filter assembly is shown at 410. The filter assembly 410 is substantially the same as the above-referenced filter assembly 10, and consequently the same reference numerals but indexed by 400 are used to denote structures corresponding to similar structures in the filter assembly. In addition, the foregoing description of the filter assembly 10 is equally applicable to the filter assembly 410 except as noted below. Moreover, it will be appreciated upon reading and understanding the specification that aspects of the filter assemblies may be substituted for one another or used in conjunction with one another where applicable.

The filter assembly 410 includes a housing 412 comprising a cylindrical canister having a lower, closed end 416 and an upper, open end 414. A cover 424 is attached to the open end 414 of the canister, and defines an internal chamber 418 therewith. The filter assembly 410 also includes a filter element 420 disposed within the chamber 418. The filter element 420 includes a first stage filter 440, a second stage filter 442, a center tube 460, and a third stage filter 480. The first stage filter 440 may be any suitable filter, such as a rolled filter element, such as an annular rolled filter element and the second stage filter 442 may also be any suitable filter, such a pleated media, such as a radially fanned pleated media. The first and second stage filters 440 and 442 may be fluidly sealed to the center tube 460, and a portion of the cover 424 may extend into the center tube 460 and be fluidly sealed to the center tube to isolate the flow entering the first stage filter 440 from the flow exiting the center tube 460.

The water coalesced from the fuel by the filter element 420, and specifically the second and third stage filters 442 and 480, flows downward towards the closed end 416, which serves as a reservoir. When the reservoir is full or at a predetermined level, water received in the reservoir may be drained through a drain 490 extending through the closed end 416 in any suitable manner.

Figure 7:
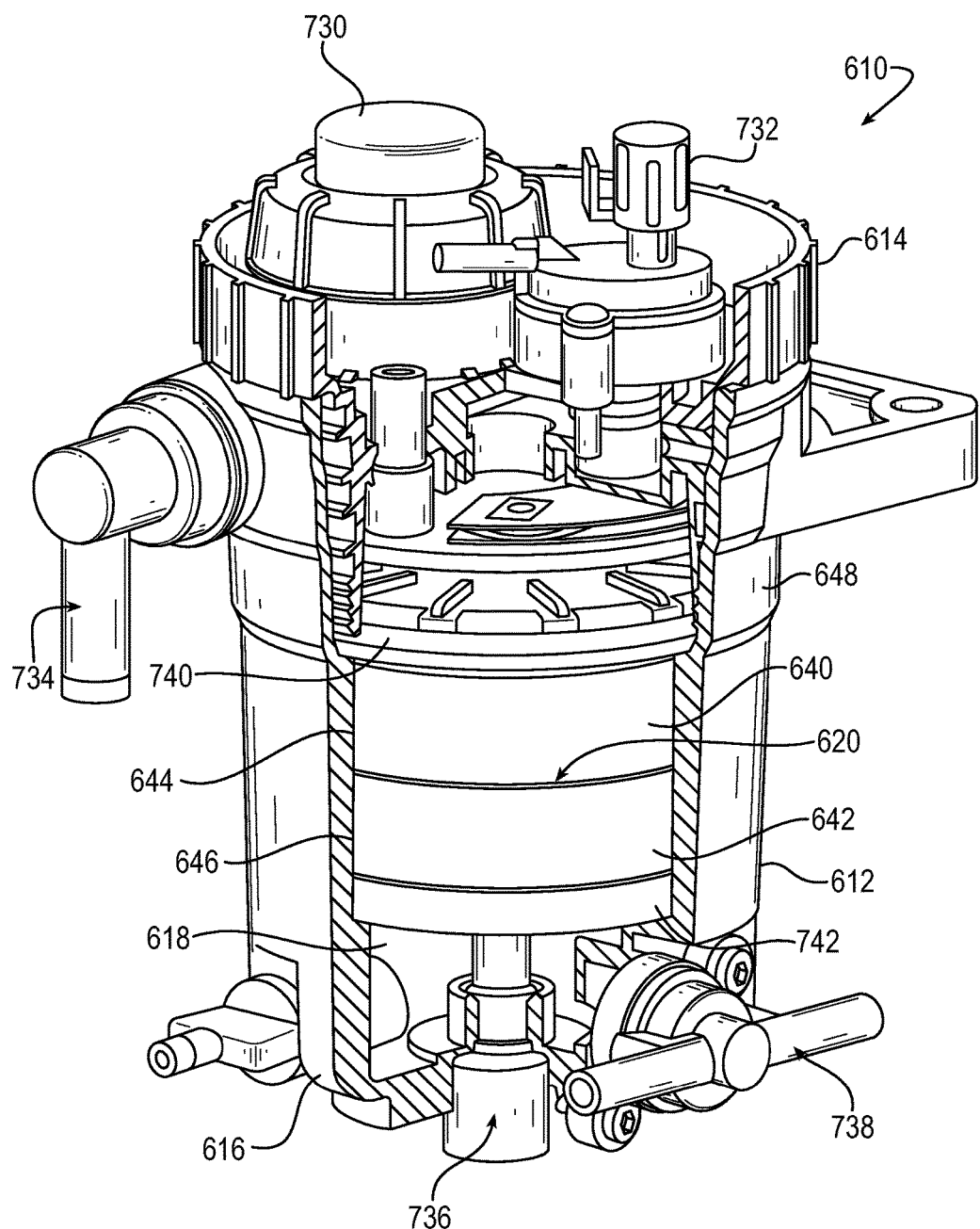
FIG. 7 is a cross-sectional view of yet another exemplary filter assembly according to the invention.

Turning now to FIG. 7, an exemplary embodiment of the filter assembly is shown at 610. The filter assembly 610 is substantially the same as the above-referenced filter assembly 10, and consequently the same reference numerals but indexed by 600 are used to denote structures corresponding to similar structures in the filter assembly. In addition, the foregoing description of the filter assembly 10 is equally applicable to the filter assembly 610 except as noted below.

Moreover, it will be appreciated upon reading and understanding the specification that aspects of the filter assemblies may be substituted for one another or used in conjunction with one another where applicable.

The filter assembly 610, which may be a cartridge type filter assembly, includes a housing 612 having first and second ends 614 and 616 and an internal chamber 618 defined therebetween, a hand priming pump assembly 730 provided at the first end 614, a vacuum pressure switch 732 provided at the first end 614, an in/out connector 734 proximate the first end 614, a probe switch 736 provided at the second end 616, a return recirculation valve 738 at the second end 616, and a filter element 620 disposed within the chamber 618. The filter element 620 includes a first stage filter 640, a second stage filter 642, a center tube, and a third stage filter. The first and second stage filters include an outer surface 644 and 646, respectively, that may be coupled to an inner surface 648 of the housing 612 in any suitable manner, or alternatively may be enclosed in a separate housing that is disposed in the housing 612 and coupled to an inner surface of the separate housing. The first stage filter 640 may be coupled to an upper end cap 740 and the second stage filter 642 may be coupled to a lower end cap 742.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter assembly configured to be coupled as a unit to a filter head, the filter assembly including:
   a housing circumscribing a central axis and having first and second ends and an internal chamber defined therebetween; and
   a filter element disposed within the internal chamber of the housing, the filter element including:
   a first stage filter circumscribing the central axis and defining a central cavity;
   a second stage filter downstream of the first stage filter, the second stage filter circumscribing the central axis and defining a central cavity; and
   a center tube disposed in the central cavity of the first and second stage filters; and
   wherein the first and second stage filters each have an outer surface coupled to an inner surface of the housing to fluidly seal the first and second stage filters to the housing,
   whereby fluid flows from the first end of the housing axially towards the second end into the first stage filter where particulates are filtered from the fluid, from the first stage filter axially into the second stage filter where water is coalesced from the fluid, and then from the second stage filter through the center tube towards the first end of the housing.

2. The filter assembly according to claim 1, wherein the filter element further includes a third stage filter disposed to receive fluid from the second stage filter and discharge the fluid into the center tube while allowing coalesced water droplets to move downward.

3. The filter assembly according to claim 2, wherein the third stage filter is disposed at a lower end of the center tube.

4. The filter assembly according to claim 3, wherein the third stage filter extends downwardly from the center tube.

5. The filter assembly according to any claim 2, wherein the third stage filter is disposed radially inwardly of the second stage filter.

6. The filter assembly according to claim 1, further including a cover coupled to the first end of the housing, wherein the cover includes at least one inlet passage for directing fluid to the first stage filter and at least one outlet passage for expelling fluid.

7. The filter assembly according to claim 6, wherein the at least one inlet passage is radially outwardly spaced from the at least one outlet passage.

8. The filter assembly according to claim 6, further including a gasket coupled to an upper end of the center tube to isolate the flow entering the first stage filter from the flow exiting the center tube.

9. The filter assembly according to claim 1, wherein the first and second stage filters are fluidly sealed to the center tube.

10. The filter assembly according to claim 1, wherein the first stage filter is disposed in the internal chamber proximate the first end for removing particulates from fluid flowing through the filter element and the second stage filter is disposed in the internal chamber proximate the second end for coalescing water in the fluid flowing through the filter element.

11. The filter assembly according to claim 1, wherein the first and second stage filters are annular rolled filter elements.

12. The filter assembly according to claim 2, wherein the third stage filter is a hydrophobic barrier.

13. A filter assembly configured to be coupled as a unit to a filter head, the filter assembly including:
a housing having upper and lower ends and a chamber defined therebetween; and
a filter element disposed within the internal chamber of the housing, the filter element including:
a first stage filter defining a central cavity and having an outer surface coupled to an inner surface of the housing;
a second stage filter downstream of the first stage filter, the second stage filter defining a central cavity and having an outer surface coupled to an inner surface of the housing;
a center tube disposed in the central cavity of the first and second stage filters and being coupled thereto, the center tube having upper and lower ends and defining a fluid flow path therethrough; and
a third stage filter disposed at the lower end of the center tube; and
wherein the first and second stage filters each have an outer surface coupled to an inner surface of the housing to fluidly seal the first and second stage filters to the housing.

14. The filter assembly according to claim 13, wherein fluid flows from the first end of the housing through the first stage filter, the second stage filter, the third stage filter, and then along the fluid flow path in the center tube.

15. The filter assembly according to claim 13, wherein the first stage filter is disposed in the internal chamber proximate the upper end for removing particulates from fluid flowing through the filter element and the second stage filter is disposed in the internal chamber proximate the lower end for coalescing water in the fluid flowing through the filter element.

16. The filter assembly according to claim 13, wherein the third stage filter is disposed at a lower end of the center tube radially inwardly of the second stage filter.

17. A filter assembly configured to be coupled as a unit to a filter head, the filter assembly including:
a housing having first and second ends and a chamber defined therebetween; and
a filter element disposed within the internal chamber of the housing, the filter element including:
a first stage filter defining a central cavity and being disposed in the internal chamber proximate the first end for removing particulates from fluid flowing through the filter element; and
a second stage filter defining a central cavity and being disposed in the internal chamber proximate the second end for coalescing water in the fluid flowing through the filter element; and
wherein the first stage filter is an annular rolled filter element; and
wherein the second stage filter is a pleated media.

18. The filter assembly according to claim 17, further including a center tube disposed in the central cavity of the first and second stage filters.

19. The filter assembly according to claim 18, wherein fluid flows from the first end of the housing through the first stage filter, the second stage filter, and then along a fluid flow path in the center tube.

* * * * *